United States Patent
Kollars, Jr. et al.

(10) Patent No.: US 6,920,716 B2
(45) Date of Patent: Jul. 26, 2005

(54) INSECT/ARTHROPOD TRAP

(75) Inventors: Thomas M. Kollars, Jr., Bel Air, MD (US); Edwin Masters, Sikeston, MO (US); Jacqueline Masters, Sikeston, MO (US); Peggy G. Kollars, Bel Air, MD (US)

(73) Assignee: Ticks or Mosquitoes, LLC, Sikeston, MO (US)

( * ) Notice: Subject to any disclaimer, the term of this patent is extended or adjusted under 35 U.S.C. 154(b) by 0 days.

(21) Appl. No.: 10/670,109

(22) Filed: Sep. 24, 2003

(65) Prior Publication Data

US 2004/0128902 A1 Jul. 8, 2004

Related U.S. Application Data

(60) Provisional application No. 60/467,677, filed on May 2, 2003, and provisional application No. 60/414,936, filed on Sep. 30, 2002.

(51) Int. Cl.⁷ ............................ A01M 1/02; A01M 1/14
(52) U.S. Cl. ........................................... 43/114; 43/107
(58) Field of Search ........................ 43/107, 112–114, 43/139, 132.1

(56) References Cited

U.S. PATENT DOCUMENTS

| | | | | | |
|---|---|---|---|---|---|
| 675,338 | A | * | 5/1901 | Nobbs | 43/114 |
| 919,507 | A | * | 4/1909 | Wiegand et al. | 43/114 |
| 944,882 | A | * | 12/1909 | Laube et al. | 43/114 |
| 2,645,877 | A | * | 7/1953 | Pohlman | 43/113 |
| 2,867,360 | A | * | 1/1959 | Sharma | 43/125 |
| 3,141,444 | A | * | 7/1964 | Kucera | 43/114 |
| 3,708,908 | A | * | 1/1973 | Levey | 43/114 |
| 4,168,591 | A | * | 9/1979 | Shaw | 43/114 |
| 4,283,878 | A | * | 8/1981 | Hill et al. | 43/114 |
| 4,506,473 | A | * | 3/1985 | Waters, Jr. | 43/114 |
| 4,519,776 | A | * | 5/1985 | DeYoreo et al. | 43/107 |

(Continued)

FOREIGN PATENT DOCUMENTS

| | | | |
|---|---|---|---|
| AU | 9944477 A1 | * | 3/2000 |
| DE | 4414796 A | | 11/1995 |
| DE | 10108179 A1 | * | 12/2002 |
| GB | 2365746 A | | 2/2002 |
| GB | 2365746 A1 | * | 2/2002 |
| JP | 5-103571 A1 | * | 4/1993 |
| JP | 6-46 A1 | * | 1/1994 |
| JP | 7-203821 A1 | * | 8/1995 |
| JP | 8-56543 A1 | * | 3/1996 |
| JP | 8-154553 A1 | * | 6/1996 |
| JP | 10-229801 A1 | * | 9/1998 |
| JP | 2000-139318 A1 | * | 5/2000 |
| JP | 2003-61541 A1 | * | 3/2003 |
| WO | WO-89/12389 A1 | * | 12/1989 |

(Continued)

Primary Examiner—Darren W. Ark
(74) Attorney, Agent, or Firm—Wolf, Greenfield & Sacks PC (57) ABSTRACT

An insect and/or arthropod trapping device that generates its own attractants of carbon dioxide ($CO_2$), and ammonia through the chemical reaction of adding a weakly acidic liquid such as vinegar (acetic acid) to solids such as baking soda (sodium bicarbonate), with the optional addition of urea and/or lactic acid. The liquids are mixed over a period of days onto the solids to generate $CO_2$ in the vicinity of an insect/arthropod trap having glue boards that trap the insects and arthropods when they alight on the glue board. The attractants can be used with devices that utilize various combinations of other insect attractants and traps such as sound, light, scent, visual, electrical, chemical, sticky surfaces, mesh nets, etc., to further attract and trap or kill insects and/or arthropods.

19 Claims, 9 Drawing Sheets

U.S. PATENT DOCUMENTS

| | | | | |
|---|---|---|---|---|
| 4,608,774 A | * | 9/1986 | Sherman | 43/114 |
| 4,802,303 A | * | 2/1989 | Floyd, III | 43/114 |
| 4,907,366 A | * | 3/1990 | Balfour | 43/114 |
| 4,918,856 A | * | 4/1990 | Olive et al. | 43/113 |
| 4,930,251 A | * | 6/1990 | Crisanti | 43/114 |
| 5,189,830 A | * | 3/1993 | Montemurro | 43/114 |
| 5,205,065 A | * | 4/1993 | Wilson et al. | 43/113 |
| 5,311,697 A | * | 5/1994 | Cavanaugh et al. | 43/114 |
| 5,417,009 A | * | 5/1995 | Butler et al. | 43/113 |
| 5,647,164 A | * | 7/1997 | Yates | 43/139 |
| 5,799,436 A | * | 9/1998 | Nolen et al. | 43/112 |
| 5,850,707 A | * | 12/1998 | Fell et al. | 43/114 |
| 5,907,923 A | * | 6/1999 | Heath et al. | 43/107 |
| 6,032,406 A | * | 3/2000 | Howse et al. | 43/114 |
| 6,055,766 A | * | 5/2000 | Nolen et al. | 43/112 |
| 6,199,315 B1 | * | 3/2001 | Suzue et al. | 43/113 |
| 6,209,256 B1 | * | 4/2001 | Brittin et al. | 43/107 |
| 6,216,383 B1 | * | 4/2001 | Klabunde et al. | 43/107 |
| 6,305,122 B1 | | 10/2001 | Iwao et al. | |
| 6,425,202 B1 | * | 7/2002 | Lin et al. | 43/107 |
| 6,467,215 B1 | * | 10/2002 | Nelson et al. | 43/107 |
| 6,508,032 B2 | * | 1/2003 | Lin | 43/107 |
| 6,516,559 B1 | * | 2/2003 | Simchoni et al. | 43/114 |
| 6,530,172 B2 | * | 3/2003 | Lenz | 43/112 |
| 6,546,667 B1 | * | 4/2003 | Carter | 43/107 |
| 6,655,078 B2 | * | 12/2003 | Winner et al. | 43/114 |
| 6,675,528 B2 | * | 1/2004 | Jablin | 43/139 |
| 6,718,687 B2 | * | 4/2004 | Robison | 43/114 |
| 6,823,622 B2 | * | 11/2004 | Lin et al. | 43/107 |
| 2003/0033747 A1 | * | 2/2003 | Crawley et al. | 43/114 |
| 2004/0025412 A1 | * | 2/2004 | Simchoni et al. | 43/107 |
| 2004/0103579 A1 | * | 6/2004 | Nolen et al. | 43/107 |
| 2004/0139648 A1 | * | 7/2004 | Durand et al. | 43/139 |

FOREIGN PATENT DOCUMENTS

| | | |
|---|---|---|
| WO | WO-92/17060 A1 | * 10/1992 |
| WO | WO-95/29584 A1 | * 11/1995 |
| WO | WO-99/26471 A1 | * 6/1999 |

* cited by examiner

INSECT/ARTHROPOD TRAP

RELATED APPLICATIONS

This application claims the benefit of U.S. Provisional Application Ser. No. 60/467,677, filed May 2, 2003 entitled INSECT TRAP, and U.S. Provisional Application Ser. No. 60/414,936, entitled INSECT TRAP, filed on Sep. 30, 2002, which are herein incorporated by reference in their entireties.

BACKGROUND OF INVENTION

1. Field of Invention

Mosquitoes, flies, ticks, fleas and chiggers are of significant economical and medical concern because humans and important species of wild and domestic animals are inconvenienced, annoyed, sickened and on occasion killed as a result of their bites. This invention relates to a means and method of attracting, trapping and disposing of them.

2. Discussion of Related Art

Mosquitoes, flies, ticks, fleas and chiggers carry a wide range of blood borne diseases which readily infect humans and animals when bitten. These diseases include among other things, lyme disease, ehrlichiosis, tularemia, vectored borreliosis (Masters disease), encephalitis, West Nile virus, Dengue Fever, malaria and others. The effect of these arthropod borne diseases are well-known and frequently cause long term and significant impairment if not death to those victims. Millions have been killed from contracting mosquito-born malaria. Efforts to trap mosquitoes, flies, ticks, fleas, chiggers and other insects and arthropods have employed a number of techniques including sticky paper, sprays and chemical attractants. The latter area of investigation has been encouraging because people and animals emit chemicals that are readily detected by these arthropods. Indeed, variations in the combination amount of chemicals emitted from one person to another are a reason why some people are more readily bitten than others.

There area a number of variables that must be considered. For example, a female mosquito may detect a potential bite victim at a distance of 20–40 yards depending on the species and weather conditions. Female mosquitoes are very active between 50° F. and 95° F. in calm or light breeze conditions. The female mosquito is sensitive to a variety of chemicals when beginning a search for a blood meal.

The mosquito is particularly sensitive to carbon dioxide emission for long distance orientation. Of the 340 or more chemicals emitted by humans that researchers have determined attract mosquitoes, carbon dioxide emission is one significant human and animal emission which is a particularly useful attractant for mosquitoes. Carbon dioxide is considered the single most important cue used by mosquitoes for locating a source of blood. Researchers estimate a person giving off 275 ml/min of carbon dioxide result in a concentration of carbon dioxide in the air of between 0.01% and 1.0%, a concentration that is well within the mosquito's ability to detect. J. P. Smith, J. Walsh, and R. Huss recently presented a study of mosquito species and numbers caught in 8 commercial mosquito traps at the American Mosquito Control Association's 2003 annual convention. Seven of the traps produced carbon dioxide by burning propane while one trap did not use carbon dioxide. The non carbon dioxide trap was markedly inferior to the other seven carbon dioxide producing traps.

There are other factors that influence mosquitoes in their search for blood meals. For example, some species of mosquitoes seek areas of increased humidity, moisture, increased temperature, and increased levels of certain compounds usually generated by sweat glands. Additionally, for some species, sound, vision, movement, light, colors and vertical contrast appear to have a role in influencing movement of mosquitoes. The mosquitoes respond to humidity and temperature gradients associated with convection currents and thus factors such as relative humidity play a role in the mosquito's search for a blood meal. Other factors that are believed to affect a mosquito's search for blood meals include the light and time of day and a mosquito's ability to detect movement, color, shapes and patterns. Overall, research suggests that the use of carbon dioxide as a basis for attracting mosquitoes remains an important component in designing effective mosquito traps. Similar considerations apply to attracting ticks, fleas and chiggers. A number of products are commercially available that produce carbon dioxide and use attractants to attract and capture arthropods. However, many of these products use explosive flammable gas such as propane as the main component or dry ice to produce carbon dioxide. Many of these methods are impractical because they cannot be transported safely by aircraft, cannot be used except under well-ventilated areas, and are not readily available or are expensive. Exemplifications of commercially available systems abound. These include, for example, a number that retail from approximately $200 to well over $1500. In addition to costs, these units have other limitations that limit their usefulness. American Biophysics Corp. has sold at least three products in this cost range that use propane to make the carbon dioxide and to generate electrical power needed. It also makes use of a vacuum unit to suck in mosquitoes. Applica Mexico also has a plug-in electrical unit that produces a chemical attractant that requires EPA registration and are useful at all only within range of an electrical power source. Replacement glue trap boards are provided but are very expensive. Flowtron sells an electrical plug-in unit that also requires an EPA registration and uses a vacuum to suck in mosquitoes as does a unit made by Elvert Specialty Products. Coleman provides a unit that burns propane to generate carbon dioxide and further requires EPA registration. Other units sold by Biosensory Inc. have similar limitations and inefficiencies.

Inexpensive, non-electrical, environmentally friendly, controllable methods for generating carbon dioxide for use in insect and/or arthropod traps developed to date have not been generally available. As noted, it is well known that hematophagouos insects and other arthropods are attracted to their hosts by sensing carbon dioxide and this is the basis for numerous previous patents such as Miller, U.S. Pat. No. 5,669,176; Wigdon, et al., U.S. Pat. No. 6,145,243; Paganessi, et al., U.S. Pat. No. 5,943,815; Iwao, et al, U.S. Pat. No. 6,305,122; etc. Previous sources of supplying carbon dioxide gas have included releasing $CO_2$ from tanks, allowing dry ice to gradually sublimate, catalytic conversion of a hydrocarbon fuel in a combustion chamber (U.S. Pat. No. 6,145,243), methanol cells (U.S. Pat. No. 5,669,176), and dropping a calcium carbonate tablet into water (U.S. Pat. No. 6,305,122). Although these methods of supplying carbon dioxide are effective, the associated tanks and/or holding containers tend to be quite large and difficult to handle and/or the rate of $CO_2$ gas release has been difficult to control, sustain and regulate. Some are also associated with devices that require electricity.

SUMMARY OF THE INVENTION

The instant invention provides a novel portable method and device for generating carbon dioxide for insect and/or arthropod trapping devices. By adding a weakly acidic liquid such as water or vinegar (acetic acid) via a tube or tubes, drip hole(s), wick(s), etc. at a controlled rate to a solid such as baking soda (sodium bicarbonate) with lactic acid and with or without urea added, the composition generates water and $CO_2$ gas. This can be demonstrated quite effectively in a kitchen by adding a spoonful of vinegar to a spoonful of baking soda. When urea is added, it reacts with the water produced by the vinegar-baking soda reaction to produce additional $CO_2$ (very desirable). Adding ammonia is also desirable, as ammonia is a known insect attractant. The lactic acid increases the $CO_2$ conversion efficacy over that of acetic acid alone, by many multiples. By controlling the drip rate or rate of vinegar or other effective liquid added to a known quantity of baking soda or other effective solid(s), a controlled quantity of carbon dioxide gas can be generated for long periods of time. In one version of our invention, one liter of acetic acid (vinegar) or even water at a controlled drip into a proportional chemical quantity of a cake comprising a mix of sodium bicarbonate (baking soda), urea and lactic acid will produce a sufficient and effective quantity of $CO_2$ to attract arthropods such as mosquitoes and ticks for up to seven days. The cost of operation will be about the same as the propane gas mosquito traps, but the manufacturing cost of the trap will only be a fraction of that of the propane trap.

The subject of this invention can be used indoors to attract disease vectors that may include the mosquito species *Anopholes gambine* (which transmits malaria within houses in Africa), *Culex pipiens* (or "house mosquito") the main vector of West Nile and St. Louis Encephalitis viruses in North America, and *Aedes aegypti* (Asian house mosquito), the principal vector of dengue virus. This invention can also be used to attract disease-carrying mosquitoes outdoors. The subject invention can also attract ticks that may include Argasid ticks which are vectors of relapsing fevers within dwellings in North American and Africa and attract Ixodid tick species to collection devices outdoors such as the Lone Star tick, the vector of Ehrlichiosis and Master's disease and the Black-legged tick, the vector of Lyme disease, Babesiosis and Ehrlichiosis. The subject of this invention can also attract pest chiggers in North America and Europe and medically important chiggers in Asia that transmit scrub typhus. The subject of this invention can attract economically important pest species that may include stable flies, no-seeums, horse flies, deer flies, sand fleas, cat fleas, and dog fleas. Studies to date suggest the present invention may attract and capture 43 medically important and/or pest species of insects.

An object of the subject invention is to provide a non-electric non-flammable method for producing carbon dioxide and/or ammonia at a slow rate. A second object of the subject invention is to provide a non-explosive method for producing carbon dioxide and/or ammonia at a slow rate. A third object of the subject invention is to provide a safe and easily shippable method for producing carbon dioxide or carbon dioxide and ammonia at a slow rate. Another object of this invention is to provide a method of generating gaseous carbon dioxide and/or ammonia by slow release from chemical compounds. This method can be used for the attraction of arthropods such as mosquitoes, flies, fleas, chiggers and ticks.

An additional object of the subject invention is to provide gaseous carbon dioxide without the use of dry ice. Another object of the subject invention is to provide gaseous carbon dioxide silently. Another object of the subject invention is to provide a method of capturing and killing arthropods without "zapping" them and aerosolizing infectious particles.

A still further object of the present invention is to provide a relatively inexpensive, easily manufactured, assembled, and installed portable device for slowly releasing sufficient carbon dioxide from a chemical packet to attract mosquitoes, chiggers and ticks to the device for subsequent disposal. One other object of the present invention is to provide a relatively inexpensive, environmentally safe, mosquito and tick trap that can be mass produced, easily distributed and maintained for long periods of time with little care or maintenance. A still further object of this invention is to provide a lightweight compact tick and mosquito trap that is easy to store and ship. One more object of the present invention is to provide an improved tick and mosquito trap that makes use of individual packets of chemicals that can be easily activated for slow emission of carbon dioxide over a period of days or even longer.

There are additional and significant advantages of the present invention. This invention provides a commercially viable inexpensive system for producing chemically, rather than electrically, arthropod attractants in the form of carbon dioxide. This system is safer, cheaper, and more environmentally friendly than other systems. By not using propane or pressurized carbon dioxide tanks, the present invention avoids emission of toxic fumes, reduces the size of the unit and provides a system that may be transported on planes and can also be used indoors.

A further object of the present invention is to provide a system with ancillary visual means for attracting arthropods. These include use of phosphorescent systems in the unit to emit both red and blue lights to maximize mosquito attraction and non-phosphorescent colors of black, red and blue. Moisture, which functions as an additional attractant to mosquitoes, is a product of the chemical reaction. Heat is also provided for further mosquito attraction by a solar energized heat brick. In this arrangement, heat is absorbed during the day and slowly released at night in sufficient amounts to attract mosquitoes as well as other arthropods.

DESCRIPTION OF DRAWINGS

The foregoing objectives and advantages of the present invention will be more clearly understood in connection with reference to the accompanying drawings in which.

DESCRIPTION OF ADDITIONAL FIGURES

The accompanying drawings are not intended to be drawn to scale. For purposes of clarity, not every component may be labeled in every drawing. Additionally the drawings as submitted may include dimensional representations which are demonstrative of a particular sized embodiment, but which are not to be construed as limiting, inasmuch as the invention contemplates a wide range of sizes and proportions.

DETAILED DESCRIPTION OF PREFERRED EMBODIMENTS

The invention is not limited in its applications to the details of constructions and the arrangement of components set forth in the following description or illustration of the drawing. The invention is capable of other embodiments and of being practiced or carried out in various ways. Also, the phraseology and termination used herein is used for purposes of description and should not be regarded as limiting. The use of "including", "comprising", or "having", "containing", and "involving" and variations thereof is meant to encompass the items listed thereafter in equivalence therefor as well as additions.

In one aspect, the invention involves in an insect and arthropod trap that functions by admixture, during the deployment of the device while it is functioning as an insect trap, of at least a first reactant with a second reactant to produce an insect-attractant species (preferably a gas). This reaction can be continuous (i.e., proceeding at a relatively constant rate during trap deployment), and can be made to occur automatically, without the need to be continuously monitored by a human. Provided below are examples of specific chemicals which can be used in connection with the invention, but those of ordinary skill in the art will readily appreciate that a wide variety of additional chemistry can be exploited in practicing the invention, and will be able to use no more than routine experimentation and knowledge of ordinary skill in the art to select, test (if necessary) and deploy chemicals different from those specifically described below, in the invention. The reader is directed to standard inorganic and organic chemistry texts for direction in this regard.

One technique, described below, for continuously introducing a first reactant to a second reactant, from which it had initially been isolated, in a continuous process not requiring human monitoring or control is to continuously drip a reactant fluid into a bolus of a second reactant, which can be a solid (e.g., cake), liquid, gas, etc. Those of ordinary skill in the art will recognize a variety of liquids that can participate in such a reaction in this manner. In the example below, the liquid is water. In other examples, the liquid can be an aqueous acid, base, electrophile, or water carrying any other component or combination of components which, when the liquid is introduced to a second reactant, participates in a reaction that generates an insect-attractive species. The liquid similarly can be non-aqueous, which by itself or via any species or combination of species suspended or dissolved therein, participates in such a reaction.

While, as mentioned, those of ordinary skill in the art will readily be able to select reactants suitable for use in the invention, a simple screening test can be used to quickly test candidate reactants to determine their effectiveness of use in the invention. First, apparatus for continuously combining the reactants is selected based upon whether the reactants are solid, liquid, or gas. Those of ordinary skill in the art are well aware of simple apparatus for combining any of these species, including drip-flow controllers activated by, e.g., low-flow pumps and related conduits, conveyers for solids, pressure-regulation valves for gases with conduits for controlling exposure of the gas to another reactant, etc. Many of these systems can include microfluidic reaction apparatus, which has been well-studied and discussed in recent literature. Reactants can be combined using such apparatus at a variety of different rates, with the environment surrounding the reaction site monitored via standard instrumentation for the production of insect-attractive species. The rate of reactant combination can be compared to the generation of an effective threshold amount of insect-attractive species to determine whether the reaction can be carried out, in the absence of human direction and control, using reasonable amounts of reactants to generate an effective amount of insect-attractive species for a sufficient period of time. Variations in the test may involve monitoring the level of insect-attractive species at various distances from the site at which reactants are combined, monitoring the reaction under various air flow conditions (for evaluation of effective outdoor use), or the like.

The particular embodiment of the invention shown in the drawings consists primarily of two main components. The first is a chemical composition consisting primarily of a carbon dioxide and ammonia generating solid chemical cake adapted to emit carbon dioxide and possibly ammonia slowly over a period of days or weeks when the chemical compound is activated by a weak acid such as acetic acid or water applied over a time period. The second primary component is a trap designed to support the chemical compound in a manner that attracted arthropods are drawn towards the emitted carbon dioxide and ammonia and are then trapped and killed in the trap supporting the chemical compound.

Ambient levels of carbon dioxide in the environment are typically in the range of 3% to 4% or less. Insects and biting arthropods are attracted by any concentration over this, even as small as 0.1 ppm (parts per millions). Mosquitoes are adapted to detect and be attracted by as little as 0.01% above ambient $CO_2$ levels, whatever they may be. The system herein described is designed to emit in the range of 10 to 300 times what mosquitoes will detect above current ambient levels. Some ticks, such as *Amblyomma americanum* (lone star) that carry tularemia, Ehrlichiosis, Lyme and/or Lyme like illness (Masters' disease) and other illnesses can detect carbon dioxide. With the spread of tick-borne illnesses such as Lyme disease and insect vectored illnesses such as the West Nile virus, the public health benefit of using relatively inexpensive and portable insect trapping devices using the very effective carbon dioxide as an attractant is self-evident. Any insects, ticks, or other arthropods trapped and killed are potentially infected vectors that might have transmitted disease to animals such as horses, pets, or humans.

The embodiment of the chemical compounds are in the form of (1) a liquid weak acid or water that functions as a weak acid to be dripped or wicked and (2) a dry compound that reacts with the liquid to produce carbon dioxide, ammonia or both. Carbon dioxide gas generated by this safe and environmentally friendly method can be used in adapted and existing devices or in new devices and insect and/or arthropod traps that can employ the use of additional attractants. The addition of urea results in the emission of a vapor of the attractant ammonia when using a cake or container comprising the chemicals sodium bicarbonate/acetic acid, improve the function of the chosen insect trap. Additional attractants such as amino acids, esters, ketones, alanine, cholesterol, hemoglobin peptone, phenylalanine, and petroleum products can also be used to enhance or to attract specific arthropods. One example of a commercially available octenol that may function as an attractant is made by Flowtron Inc. It may be inserted within the trap.

The present design may also incorporate appropriate colors for the disease carrying vectors, as well as a passive heat sink to maintain a temperature differential to additionally attract, and special olfactory or scent attractants, etc.

The dry compound forming the present inventions includes in one preferred embodiment a mix of:

64 to 100 parts by weight of sodium bicarbonate
0 to 25 parts by weight of lactic acid
and 0 to 11 parts by weight of urea The liquid compound may comprise water and/or a weak acid such as acetic acid.

The following is an example summary of the chemical reactions achieved in use of this system:

Added urea will react to the water produced in the above reaction to produce additional $CO_2$ and ammonia, both desirable.

The anticipated preferred embodiment of the compounds which are used to produce carbon dioxide and/or ammonia gaseous phase are in the form of:

$$H_2O + 2C_3H_5O_3 + 11NaHCO_3 \rightarrow 6H_2O + 17CO_2 + 11NaH$$

$$CH_4N_2O + H_2O \rightarrow CO_2 + 2NH_3$$

Examples of the use of the embodiment of the slow release of carbon dioxide and/or ammonia are:

EXAMPLE 1

500 ml of $H_2O$ is wicked at a rate of 2 ml/hr from a lower container to a chamber above containing 180 g lactic acid $C_3H_6O_3$. 453 g sodium bicarbonate $CHN_aO_3$. 80 g urea, $H_2NCONH_2$. The subsequent release of carbon dioxide $CO_2$ are 3x–10x the minimal detection threshold for mosquitoes for 7 days.

EXAMPLE 2

500 ml of $H_2O$ is drip wicked by a conveyor at a rate of 2 ml/hr from an upper container to a chamber below containing 180 g $C_3H_6O_3$, 453 g sodium bicarbonate $CHNaO_3$, 80 g urea $H_2NCONH_2$. The subsequent release of $CO_2$ and $NH_3$ are 10x the minimal detection threshold for mosquitoes for 7 days.

EXAMPLE 3

500 ml of $H_2O$ is dripped through a valve at a rate of 2 ml/hr from an upper container to a chamber below containing 180 g $C_3H_6O_3$, 453 g sodium bicarbonate $CHNaO_3$, 80 g urea $H_2NCONH_2$. The subsequent release of $CO_2$ are 3x–10x the minimal detection threshold for mosquitoes for 7 days.

Example #3 may be modified by deleting urea from the mix. This will result in the emission of carbon dioxide but not ammonia. The example may also be modified by adding other attractants. For example, 0 to 10% peptone, o-15% phenylalamine, 0 to 15% beta alanine or 0 to 10% cholesterol may be added. Alternately, a combination of two or more of these attractants up to about 15% of the mix are also contemplated.

The systems described above are effective in functioning as an attractant within two hours. In one test, within two hours, in an outdoor environment, 300 mosquitoes, 1100 noseeums and 12 horseflies were trapped. It is believed the system can operate using examples set forth above or their equivalents for, in the order of, seven days. The length of the continuous emission may be controlled by the volume of water or water/acetic acid mix that is used.

The method shown in the various examples, such as Example 3, may be implemented using apparatus shown in the drawings. In this arrangement, in the embodiment of FIGS. 1 and 2, a dispenser 1 is provided which may be set on a surface or suspended above ground by hanging it from a wire or cord (not shown) connected to a handle or hook 2.

Figure 1:
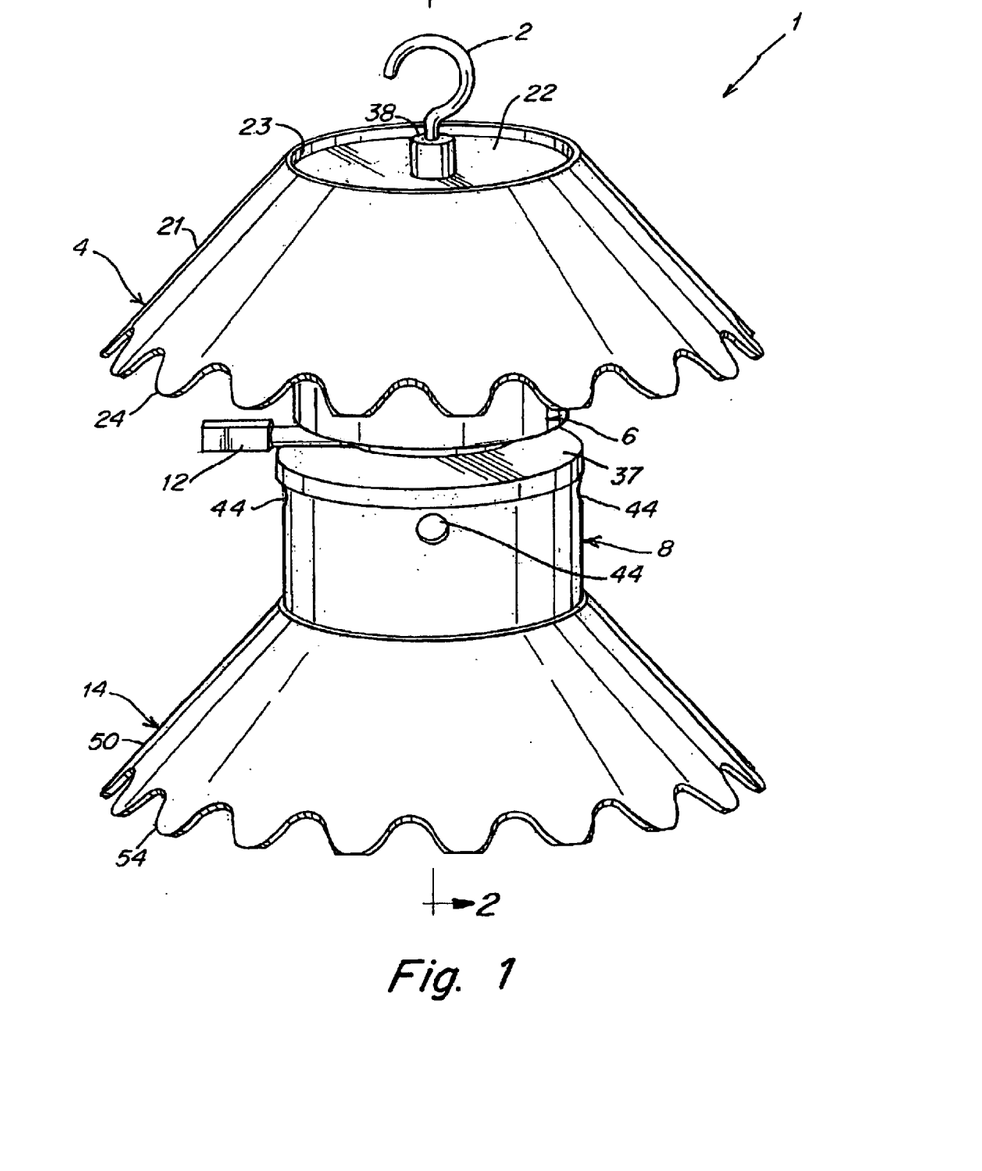
FIG. 1 is a perspective view of a typical trap embodying the invention.
Figure 2:
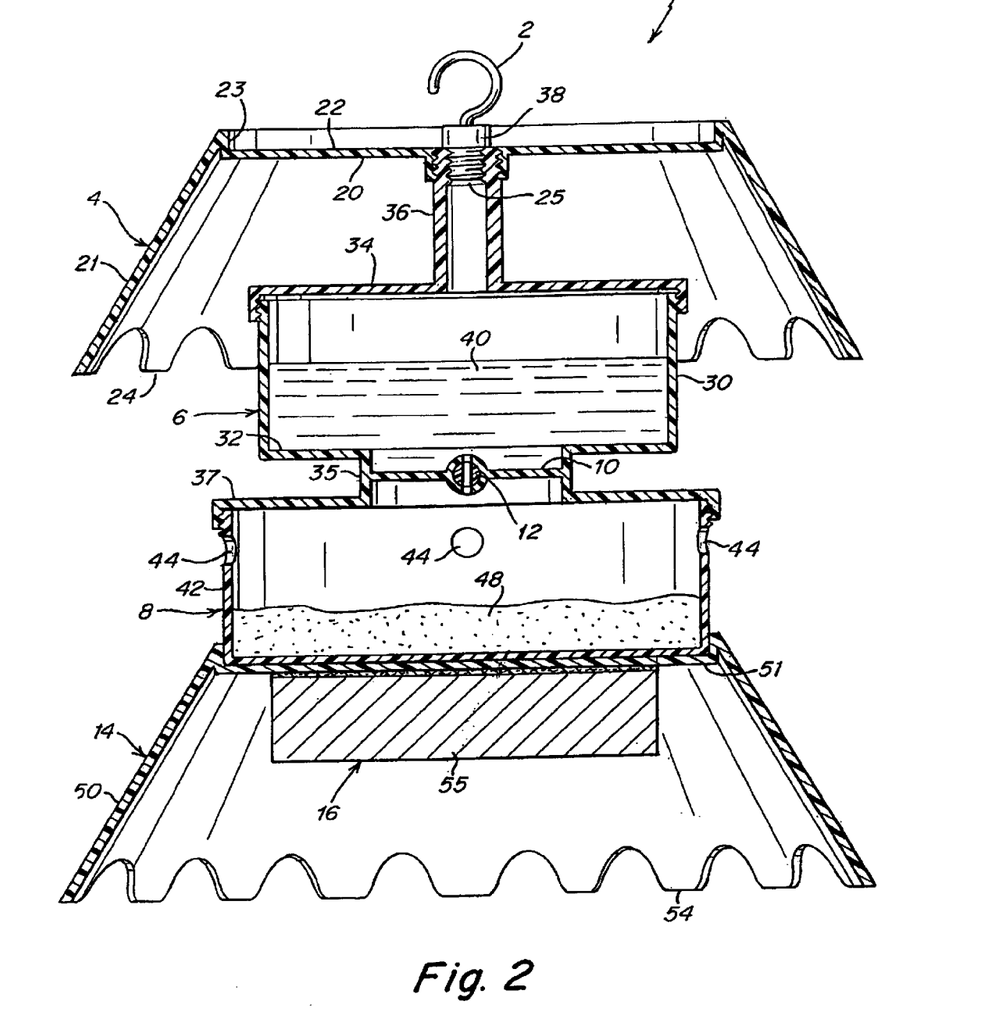
FIG. 2 is a cross-sectional elevation of the embodiment of FIG. 1 taken along the line 2—2 of FIG. 1.

The dispenser includes a hood 4, upper container or water cup 6, lower container or fuel cup 8, diaphragm 10, valve 12, skirt 14, and stabilizer/heat sink 16.

The hood 4 is formed with a continuous side wall 21 which, in one preferred embodiment, is frusto-conic in configuration with or without holes placed medially. A recessed or depressed cover 22 spans and is connected to the upper edge of the wall 21 by a circumferential flange 23. The lower edge 24 of the wall 21 may be preferably scalloped as illustrated in FIG. 2. The wall 21 is preferably frusto-conic in configuration, but may assume other shapes depending upon the particular purpose and size of the device. Other shapes are contemplated. An opening 25 is centrally formed in the recess cover 22. The opening 25 may be threaded to receive a plug 38. Plug 38 may be integrally formed with the handle or hook 2. The hook 2 may take a wide range of shapes from a simple coat hanger hook shape to a more elaborate handle-shaped and sized to permit the unit to be carried by an individual using the hook 2 as a handle. The hood 4 is coated on at least the inner surface 20 by a non-drying or slow drying adhesive of conventional material used to hold insects and arthropods when they alight on its surface. Typically adhesive or glue paper material may be used and suitably secured to either the outside or inside of hood 4. It may be modified, however, to include chemicals specifically designed to eradicate the target insects and/or arthropods. The adhesive coating may be applied to the inner surface of wall 21 and the inner surface of the bottom surface of cover 22 of the hood if desired. In some instances, limiting the adhesive to surface 20 is desirable if replacement hoods are to be stacked. If the adhesive or arthropod attractive surface is limited to surface 20, a stack of hoods 4 may be nested together if properly shaped so that the walls 21 do not touch one another. A protective strippable paper or plastic covering the adhesive paper may also be employed until the unit is activated. Instead of coating the inner surfaces, glue paper or similar material may be lined against the surface and be removably secured to it by clips or the like so the glue paper may be changed when desired.

The upper container 6 comprises a cylindrical wall 30 (or other shape), a bottom wall 32, and cap 34. The cap 34 may be formed with an inlet tube 36 open at the top and extending through the cover for introducing water into the upper container 6. The inlet tube 36 and cap 34 may be separately formed and thereafter secured to the cover 20 by suitable means such for example, as externally threading the end of tube 36 to engage a complimentary thread in the opening in the cover 22. Other arrangements convenient for fabricating the unit are contemplated. In this arrangement plug 38 closes the upper end of tube 36. It may threadingly engage the tube 36. The bottom of the upper container is suitably connected to cap 34 and is closed at its bottom by the diaphragm 10 in which the valve 12 is positioned. A suitable stopcock which is externally accessible engages and controls valve 12 to permit a selected drip rate of water 40 from the upper container 6 into the lower container 8 onto the chemicals such as described in Example 3.

The upper container 6 may be formed in a variety of shapes. In the embodiment illustrated, the cap 34 may be threaded to the upper edge of cylindrical wall 30. The upper container may be integrally molded with the cover 37 of the lower container 8 with the cover 37 connected to the bottom wall 32 by the annular neck 35.

The lower container 8 may also be formed with a cylindrical wall 42 containing a series of holes 44 to permit outward passage of the $CO_2$ and $NH_3$ emitted by the chemical reaction of Example 3. The cylindrical wall 42 is suitable connected to the cover 37 by a variety of means including for example, a threaded inter-engagement between the inner surface of a depending flange extending from the cover 37 and the outer upper periphery of the wall 42.

A quantity of dry chemicals 48 such as described in the Examples is located in the lower container 8 below the valve 12.

The skirt 14 may have a shape similar to the shape of hood 4 and in some installations, may have desired to be interchangeable with it. In this arrangement, the skirt 14 is formed with a frusto-conic side wall 50, and a cover 51. The wall 50 is also formed with a lower scalloped edge 54 similar to the scalloped edge 24. The purpose of the scalloped lower edge is to permit space for mosquitoes, ticks and chiggers and other arthropods to crawl underneath the skirt 14 if the scalloped edge 54 of the dispenser is placed on a surface. Suitably secured with the skirt 14 is a solid and relatively heavy heat sink 55 which may be formed of a variety of materials such as metal, brick, or plastic composite, whose purpose is to provide a heat emitting surface and also for purposes of functioning as a relatively effective stabilizer so that the unit does not readily tip. The heat sink may be secured by a cement, an adhesive or other means to the inner surface of the cover 51.

In an alternate embodiment, the skirt 14 may be secured to the unit in a reverse position so that it acts as a receptacle for carbon dioxide forming a reservoir or basin for purposes of increasing efficiency.

The various components may be made more effectively by molding the hood 4 and the skirt 14 to be interchangeable.

In order to increase the arthropod attracting nature of the unit, the hood 4 is preferably black in color while the cover 22 is preferably a red phosphorescent color while the handle 2 is preferably phosphorescent blue if the phosphorescent color combinations are contemplated. These colors may be modified for purposes of attracting alternative arthropod species. The colors will range from near infrared to ultraviolet. The location of the adhesive strips on the inner surface 20 of hood 4 and the inner surface of skirt 14 is intended to provide a more sightly arrangement in which trapped mosquitoes, chiggers ticks and the like are not ordinarily visible. Additionally, the inner surfaces of the hood 4 and skirt 14 are preferably roughened to facilitate movement of insects towards the glue area or adhesive strips. As described in further detail below, and as illustrated in FIG. 3, in one embodiment, the entire trap sits upon a round base or tray 165 that include slots and adhesive strips.

By providing a stop cock control of valve 12, the rate of water flow from the upper container 6 through the valve 12 onto the chemical bed contained in lower container 8 may be controlled so as to conserve or speed up the dissipation of carbon dioxide. In place of a valve 12 the invention also contemplates other flow control means in the form of a fluid conveyor comprising a pipette or restrictive funnel with or without a wick extending through it and made of suitable material such as cotton. If desired, the inner surface of skirt 14 may be covered with a tape having a sticky outer surface for purposes of trapping ticks and the like that may crawl onto the dispenser. An appropriate filter may be positioned over the valve 12 if the water used is not clean. The chemicals positioned in the lower container 8 may be solid or dispensed in cake form for easy replacement. Typically, a cake of such material may last for in the order of 168 hours while generating sufficient $CO_2$ to attract insects and arthropods.

The present invention also contemplates forming the chemicals or a dry composition or cake for insertion in the lower container 8. To be sure that the dry chemicals inserted in container 8 are proper in composition, it is desirable that the dry chemicals contemplated by the present invention and not other substitute chemical compositions be used for that purpose, the shape of container 8 may be specially designed to receive a complimentary specially shaped dry chemical cake. This shape may for example, comprise a star shape or some other irregular configuration of dry chemicals which fit closely into the interior of container 8.

Figure 3:
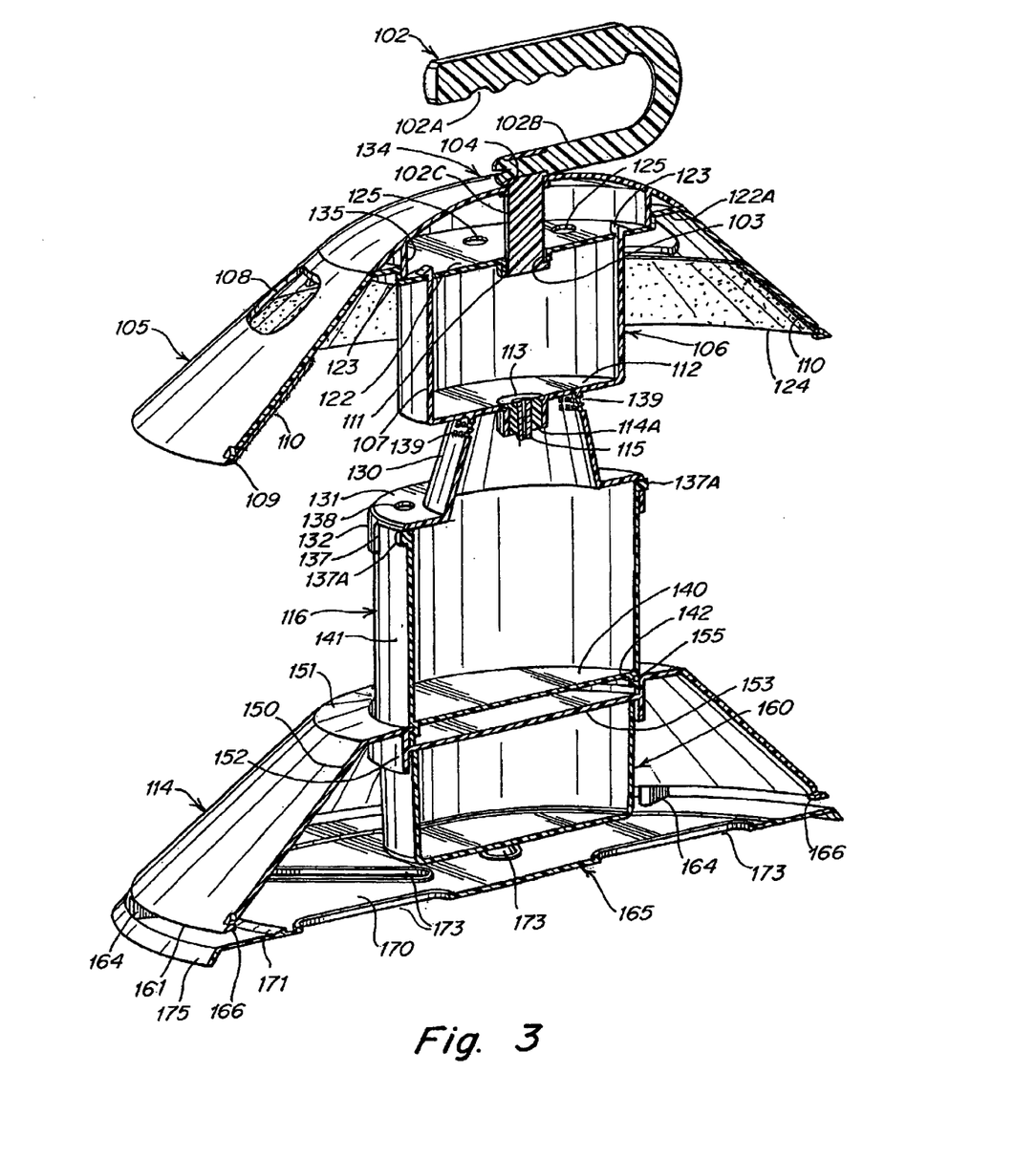
FIG. 3 is a partially cross-sectional isometric view of another embodiment of the invention.
Figure 4:
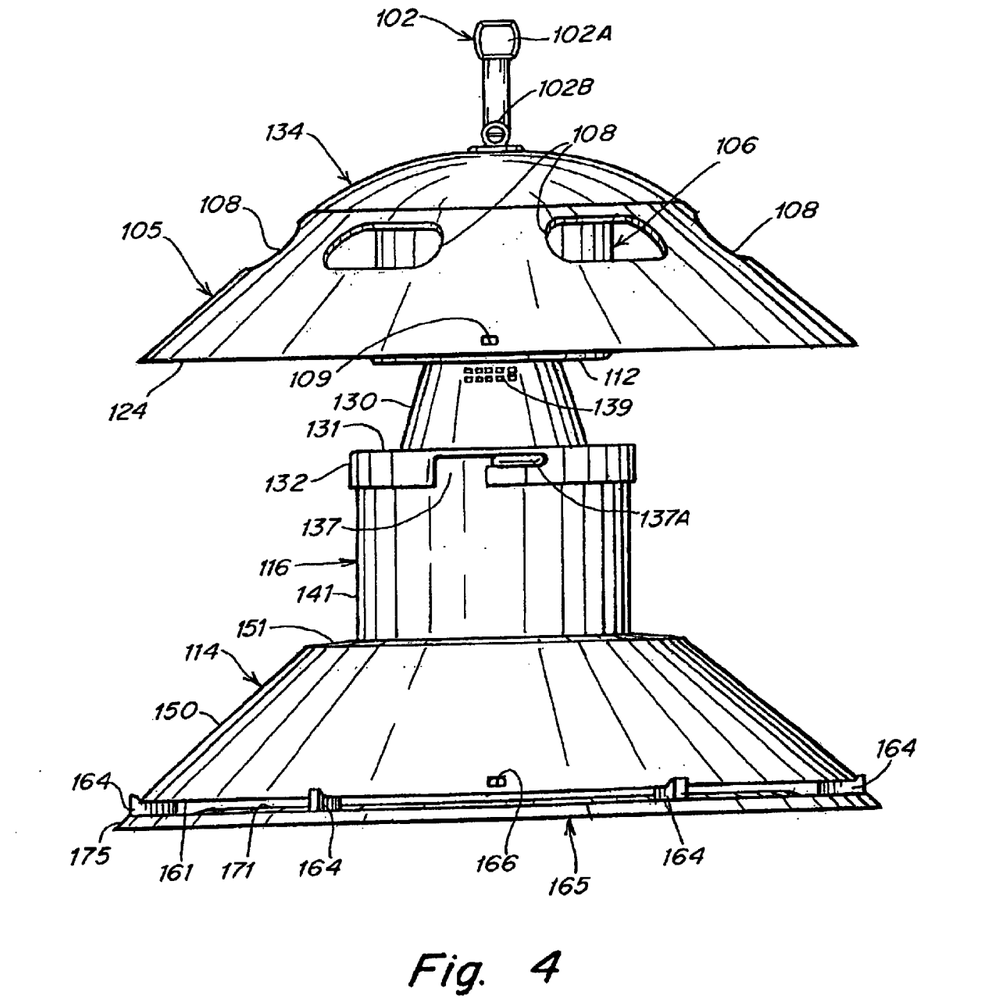
FIG. 4 is a side elevational view of the embodiment of FIG. 3.
Figure 5:
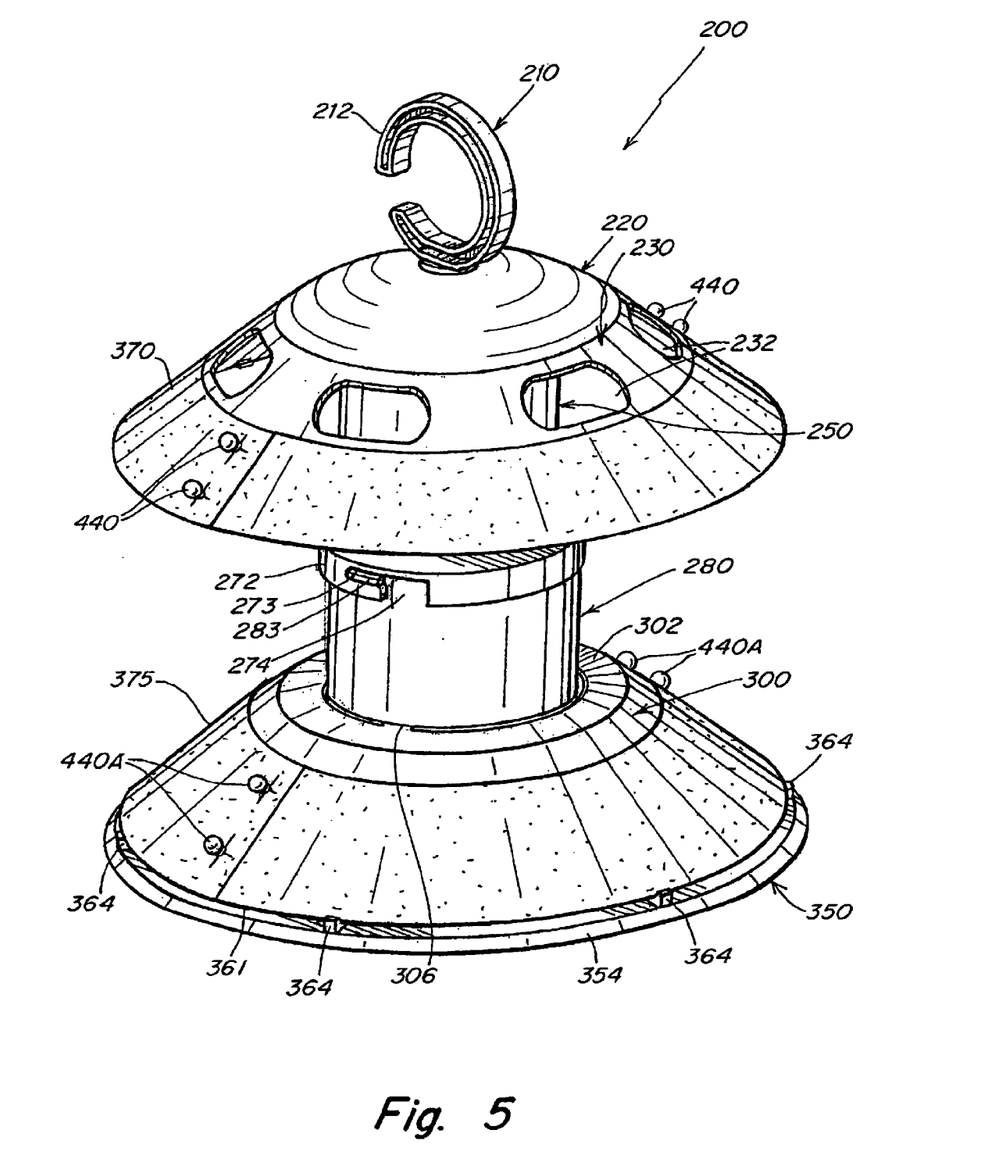
FIG. 5 is a perspective view of a further embodiment of the present invention.

A further and preferred embodiment of the present invention is illustrated in FIGS. 3 and 4. In the arrangements of FIGS. 3 and 4, the structure has some components corresponding in general arrangement to the components of the embodiments of FIGS. 1 and 2. Accordingly, some of the terms used in describing the embodiment of FIGS. 3 and 4 will be similarly identified. In this arrangement, a handle 102 having a U-shape with one leg having a scalloped finger edge 102A is connected by a bight section to a pivoting leg 102B with this pivoting leg 102B journalled in a passage formed at the top of post 102C. Post 102C has an opening in which the handle is rotatably locked by interengagement of the post with leg 102B in a manner that will permit pivoting rotation of the handle with respect to the post. The post 102C extends through a cap 134 which is dome shaped. The lower end of post 102C extends through a notched opening 103 in the depressed cover 122. A similar notched opening 104 in the cap 134 permits the post to be projected through the openings 103 and 104. The post 102C is provided with a laterally extending flange at its lower end shaped with projecting radially opposed tabs adapted to pass through the notched openings 103, 104 and further adapted when the handle 102 is rotated ninety degrees to lock the handle to the cap 134 and depressed cover 122 by interengagement of projecting tabs of the laterally extending flange 111 with the lower surface of depressed cover 122.

The cap 134 is preferably dome shaped and may be provided with a depending annular flange 135 that extends downwardly to and engages the upper surface of depressed cover 122 when the cap 134 and cover 122 are interlocked. The cap 134 is coextensive with hood 105, which is frustroconic in shape and is integrally connected to the depressed cover 122 by the stepped annular flange 122A. The hood 105 is formed with a radially arranged series of openings 108 that circumscribe the hood 105. In this embodiment, the hood 105 is preferably formed with a smooth annular lower edge 124. A series of radially arranged, inwardly projecting tabs 109 are formed near the lower edge 124 of the hood 105. These inwardly projecting tabs may be molded or appropriately vacuum formed in the hood to project a short distance inwardly to form engaging tabs for an annular glue board or annular glue board segments 110. The annular glue board or glue board segment 110 are locked into and against the inner surface of hood 105 by interengagement of the lower edge of the glue boards with the inwardly projecting tabs 109. These glue boards 110 may be otherwise secured to the inner surface of the hood 105. They may be made of flexible material such as paper or foil, suitably coated with an adhesive suitable to trap insects. They provide an appropriate disposable surface for engaging ticks, mosquitoes or other insects. Glue boards 110 may be formed as annular segments or as an annular ring and should be designed for replacement purposes. The glue boards may have a non-adhesive outer surface and an adhesive inner surface capable of catching and holding ticks and other insects on engagement. An upper container 106 is preferably annularly formed with a continuing side wall 107 and an integrally formed bottom 112. An opening 113 is centrally formed in the bottom 112. A gasket or grommet 114A annularly formed about a pipette 115 secures and seals the pipette in opening 113 in a manner that will permit fluid contained within the upper fluid container 106 to drip slowly through the axial opening in pipette 115 into a fuel cup or container 116. The upper container 106 is secured to the depressed cover 122 by projecting barbs 123 with at least two projecting barbs 123 on diametrically opposite sides of the container 106 projecting upwardly through corresponding openings in the cover 122 to lock the container 106 to the cover. Additionally, a series of holes 125, preferably four in number, are arranged radially about and extend through the cover 122.

The bottom 112 of the upper container 106 is integrally formed with a frustro-conic section 130 that has a radially outwardly extending flange 131 at its lower edge. The flange 131 has a depending annular flange 132 extending downwardly from its outer edge with this depending annular flange formed with at least two lock slots 137 (FIG. 4) formed diametrically opposite one another in the flange 132. The radially extending flange 131 optionally may be provided with a plurality of passages 138 arranged radially around the flange 131. Alternately, or in addition, a series of passages 139 may be formed in the frusto-conic section. The purpose of the passages 138 and/or 139 is to permit emission of gases formed in the container 116 as herein described. The container 116 is designed to receive the active materials referred to above including, for example, the materials described in the various examples. This material is placed on the bottom 140 of container 116 directly under the pipette 115 to receive the water or other fluid dripping from the upper container 106 through the pipette. The side wall 141 of container 116 is formed with an annular channel 142 in its outer wall a short distance below the bottom 140. The container 116 is also formed with a plurality of locking tabs 137A positioned, shaped and sized to engage lock slots 137 to secure container 116 to the flange 132.

Skirt or shroud 114 has a sidewall 150 that is frusto-conic in shape. This side wall 150 terminates in an upper inwardly extending annular wall 151. The inner edge of the wall 151 has a depending annular flange 152 integrally formed with it. A bottom wall 153 extends across the depending annular flange 152 intermediate its upper and lower ends and forms a support for the bottom 140 of fuel cup or container 116. A series of inwardly extending lips 155 project inwardly from the upper wall 151 into the annular channel 142. There are preferably at least four of such inwardly projecting lips radially arranged about the wall 151 with the lips 155 shaped and sized to snap fit into the annular channel 142. A heat sink cup 160 is positioned below the fuel cup or container 116 and skirt 114 with the cup 160 shaped and sized to snugly fit within the lower portion of the depending flange 152. The height of this cup 160 may be sufficiently high to occupy the space between the bottom wall 153 and the tick tray hereafter described. This heat sink cup 160 is shaped and sized to receive an appropriate heat sink which may consist of any heat retaining material such as a block of metal. The heat sink is designed to receive and retain heat during the day when temperatures are elevated and slowly emit heat when temperatures fall during the evening and night. This heat sink, therefore, acts as a heat source that attracts various ticks and arthropods in the course of the evening.

The skirt 114 is formed with an annular lower edge 161 that fits on and is secured by a series of stops 164 that project upwardly from the periphery of the tick tray 165. Preferably, at least four or more stops 164 should be radially arranged around the periphery of the tick tray 165 to support the skirt 114 and the other elements of this assembly slightly above the tick tray 165, with a space between lower edge 161 and the tray 165 to allow ticks to enter. The skirt 114 is further provided with a series of inwardly projecting tabs 166 similar in function and design to tabs 109. These tabs 166 project inwardly a sufficient distance and are radially arranged about the inner surface of the skirt 114 to engage the lower edge of an annular glue board similar to glue board 110 or to otherwise support glue board segments (not shown) radially arranged and secured to the inner surface of skirt 114. These glue boards are designed similarly to the previously discussed glue boards 110 and are intended to be replaceable.

The tick tray 165 is formed with a supporting top 170. An upwardly projecting annular bead 171 extends radially about the top 170 and projects upwardly to define an inner circular area within which a replaceable glue board may be placed. The glue board is die-cut with radial slots that correspond with similar slots 173 in the top 170. These radially arranged slots which may be four or more in number extend outwardly to just short of the bead 171. The slots 173 function to allow ticks and insects that may be crawling on the underneath of the unit to get into the interior of the unit and climb onto the top 170 and be caught by the glue board resting on it. The outer periphery of the tick tray 165 has a descending annular flange 175 that supports the tick tray above ground level. Since the tick tray will often be placed outdoors on ground, the annular flange 175 will in many instances not be flush with the ground surfaces, thereby permitting areas under which ticks and other insects may crawl. It is these ticks and insects that will ordinarily crawl through the slots 173 and be caught by the glue board on the tick tray.

The outer surface on the upper container 106 may be provided with a luminescent surface of a selected color. This luminescent surface will appear to ticks and insects looking at the luminescent side wall 107 as a moving light as the tick or insect, itself, moves. This appearance of a moving light will thus appear as an attractant to the tick or insect. When seen by an insect from a distance, the luminous light appearing through holes 108 may appear to be the eyes of a mammal.

Accordingly, there are several tick and insect attractant functions of the invention described in FIGS. 3 and 4. First, fluid such as water or other materials herein described contained in the upper container 106 dripped through the pipette 115 onto the reactant material in the fuel cup 116. This slow emission of carbon dioxide and ammonium is emitted over a prolonged time period through the openings 138 and/or 139 to function as an insect or tick attractant. Additionally, the radiation of heat from the heat sink within the heat sink cup 160 also generates an attractant source to ticks and insects. Additionally, the appearance of moving light from the chemiluminescent-coated outer container 106 through the openings 108 is a third form of insect/tick attraction.

Referring now to the further embodiment illustrated in FIGS. 5 to 9 and following, there is shown a trap intended for the same purposes as the embodiments shown in FIGS. 1–4. In this embodiment 200, the primary components include a handle 210 connected as herein after described to a dome 220 which supports a hood 230. Also supported by the dome is an upper container or water cup 250 that is integrally connected as more fully described with a frusto-conic section 270, the lower end of which is engaged with a fuel cup or container 280. The fuel cup or container 280, at its lower end, engages the skirt 300 which, in turn, engages the heat sink cup 330 beneath the skirt 300.

Figure 6:
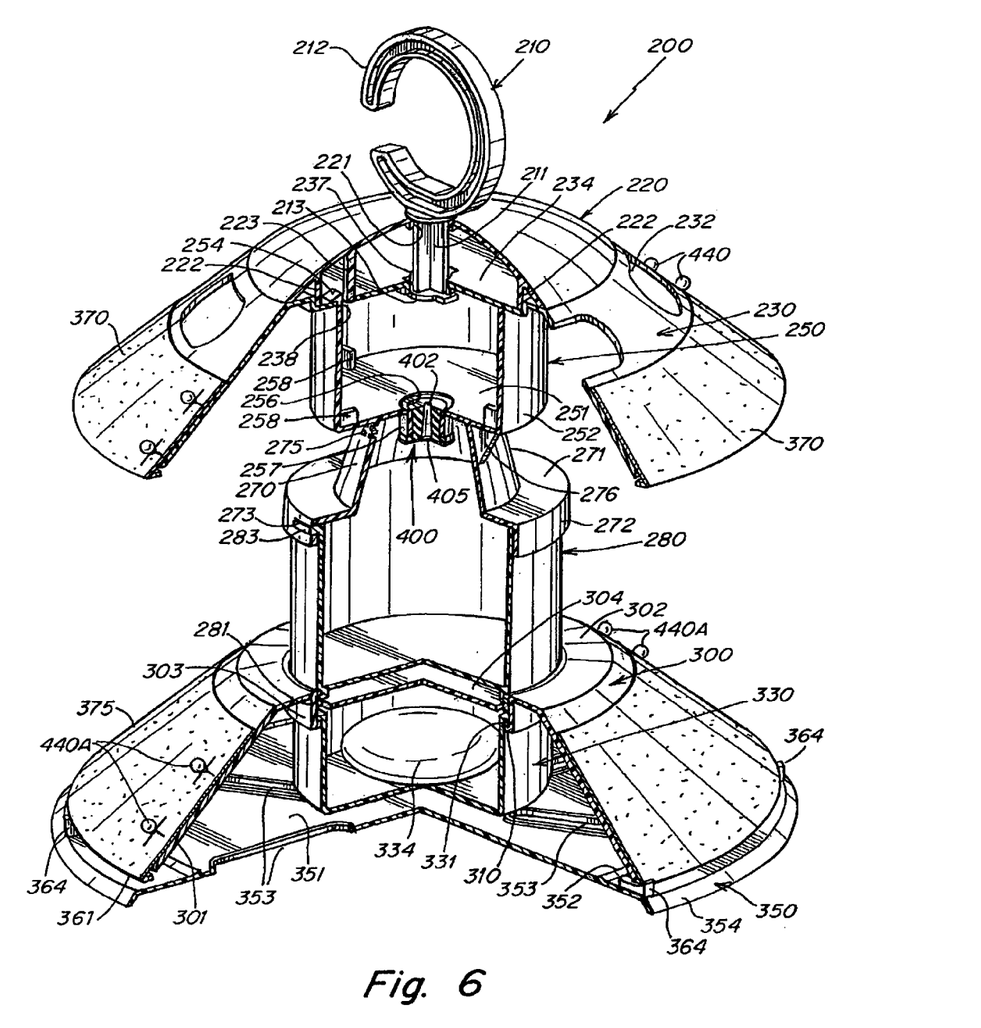
FIG. 6 is a partially cross-section view of the embodiment of FIG. 5.

A tick tray 350 supports the skirt 300 and the other elements of the structure. Additionally, one or more glue boards or adhesive strips may be supported strategically on top of or under the hood 230 and the skirt 300. The embodiment illustrated in FIG. 6 shows these glue boards supported on the outer surfaces, although glue boards may also be appropriately installed both on the outer and inner surfaces of the hood and skirt.

This tick tray 350 (FIG. 7) is formed with a supporting top 351 and upwardly projecting annular bead 352 that extends radially about the top 351 to define an inner circular area within which a replaceable glue board (not shown) may be placed as desired. A glue board is die cut with radial slots that correspond with similar slots 353 in the top 351. These radially arranged slots which may be four or more in number and in this case six, extend outwardly to just short of the bead 352. The slots 353 function to allow ticks and insects that may be crawling on the underneath of the unit to get into the interior of the unit and climb over the top 351 to be caught by the glue board resting on it. The outer periphery of the tick tray 350 has a downwardly flared annular flange 354, that supports the tick tray above ground level. Since the tick tray may often be placed outdoors on grounds that are not perfectly smooth, the flange 354 will not be flush with the ground, thus providing small raised areas or openings that will permit ticks and other insects to crawl beneath the tray 350. These ticks and insects may crawl through the slots 353.

Figure 7:
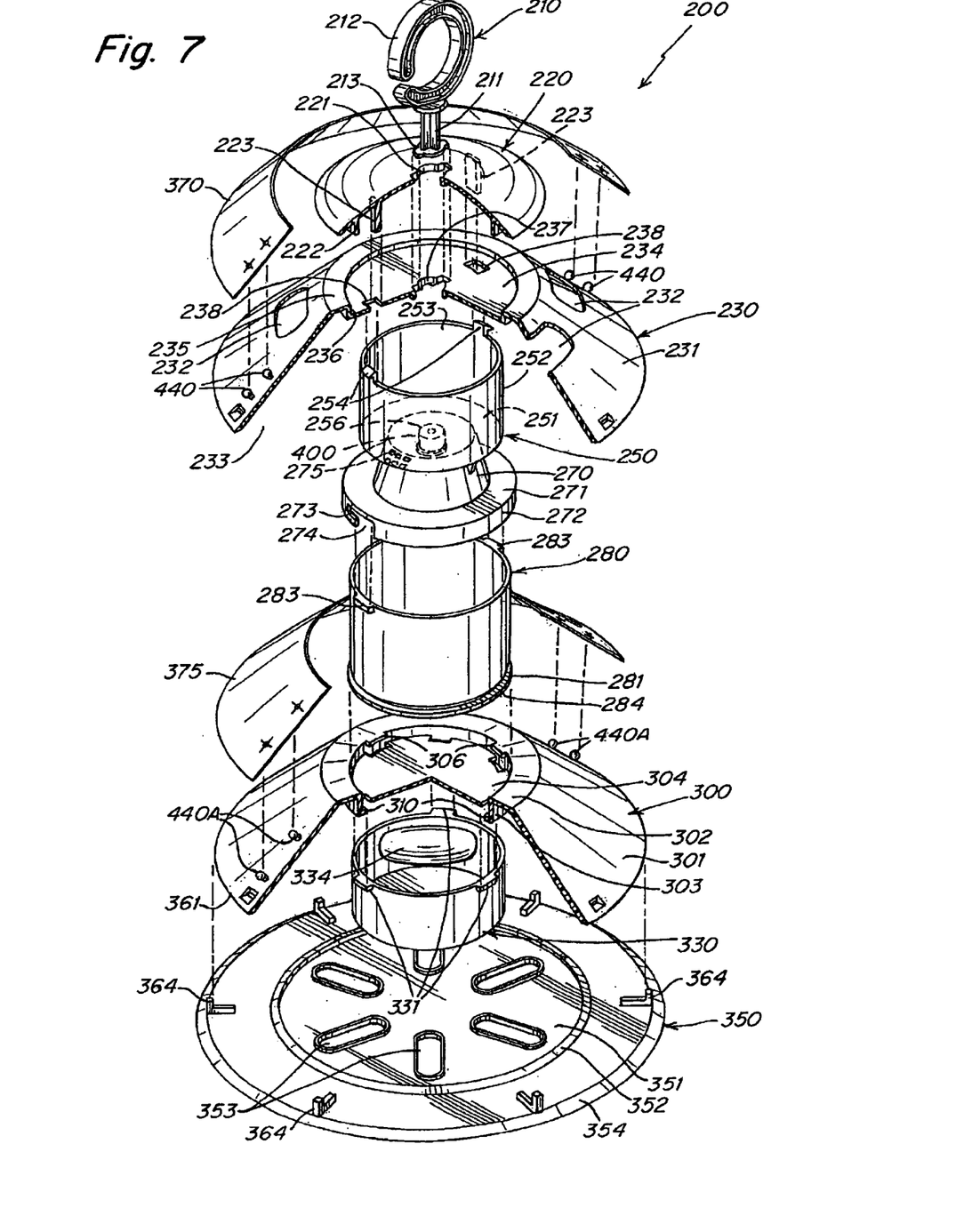
FIG. 7 is an exploded perspective view of the embodiment of FIG. 5.

In addition, the skirt or bottom shroud 300 is formed with a lower annular edge 361 that fits on and is secured by a series of stops 364 that project upwardly from the tick tray 350 to support the skirt slightly above the tick tray 350, with the space between the lower edge 361 and the tray providing space that allows ticks to enter. The skirt 300 has a sidewall 301 that is frusto-conic in shape. This sidewall 301 terminates at its upper end in an inwardly extending annular wall 302. The inner edge of the wall 302 has a depending annular flange 303 integrally formed with it. A bottom wall 304 extends across the depending annular flange 303 intermediate its upper and lower ends and forms a support for the bottom of the fuel cup 280 as described hereafter. A series of inwardly extending lips 306 project inwardly from the inner edge of the annular wall 302 to engage the fuel cup 280 as hereafter described. There are preferably at least four, and as illustrated in this embodiment six, such inwardly projecting lips 306 radially arranged about the wall 303. The lips 306 are shaped and sized to snap fit over the annular flange 281 described hereafter.

The heat sink cup 330 is shaped and sized to receive an appropriate heat sink 334 which may consist of any heat-retaining material such as a block of metal or a quantity of a heat retaining gel. Other heat sources are also contemplated, such as a battery-operated heat pad. The heat sink is designed to receive and retain heat during the day when temperatures are elevated and slowly emit heat when temperatures fall during the evening and night. The heat sink 334 therefore acts as a heat source that attracts various ticks and arthropods through the course of the evening. In one preferred embodiment, an appropriate gel commercially available in heat and cold compresses may function as the heat sink material. The advantages of such commercially available gel is it is inexpensive and functions quite satisfactorily. A plurality, preferably three equally spaced dogs 331, project outwardly from the upper edge of the cup 330 to interlock with inwardly extending lips or flanges at the lower edge of flange 303 as illustrated at 310. The dogs 331 thus interlock with the inwardly extending flanges 310 to hold the cup 330 firmly against the inner surface of the shroud 300. Before securing the heat sink cup 330 to the skirt 300, a quantity of gel or other heat sink material as previously described should be inserted into the cup.

A fuel cup 280 is preferably cylindrical in shape with an open top and closed bottom. At the bottom, an annular flange 281 circumscribes the outer wall of the cup 280. The flange 281 extends upwardly from the bottom edge 284 of the cup. It is shaped and sized to engage in a snap fit the inwardly engaging lips 306. Thus the cup 280 may be popped into engagement with the skirt or shroud 300. The upper edge of the cup 280 is provided with a pair of outwardly extending tabs 283 diametrically opposed to one another and extending outwardly from the outer upper edge of the cup. The fuel cup 280 is sized to receive a quantity of chemicals 285 of the type described earlier. Preferably, these chemicals will be reactive to water or other fluids that cause the chemicals to emit carbon dioxide over a prolonged time period.

The frusto-conic section 270 (FIGS. 6–8) of the upper container or water cup 250 is secured to the upper edge of the fuel cup 280. In this arrangement, the lower edge of the frusto-conic section 270 terminates in an outwardly extending annular flange 271, in turn terminating in a downwardly extending skirt 272. The downwardly extending skirt 272 is provided with at least a pair of opposed lock slots 273 shaped and sized to inter-engage the fuel cup 280 by engagement of the outwardly extending flanges or tabs 283 of the cup 280 in the key hole slots 273. The slots 273 extend radially about the skirt for a length longer than the length of the tabs 283 with downwardly extending openings 274 continuous with the slots 273 having a width at least equal to the width of the tabs 283. A lattice work of openings 275 extend through the upper end of the frusto-conic section 270 just below the container 250. This lattice of openings 275 may be provided on opposite sides or diagonally opposite portions of the conic section 270. These openings 275 provide passage for the outward flow of air that has reacted with the chemical.

Figure 8:
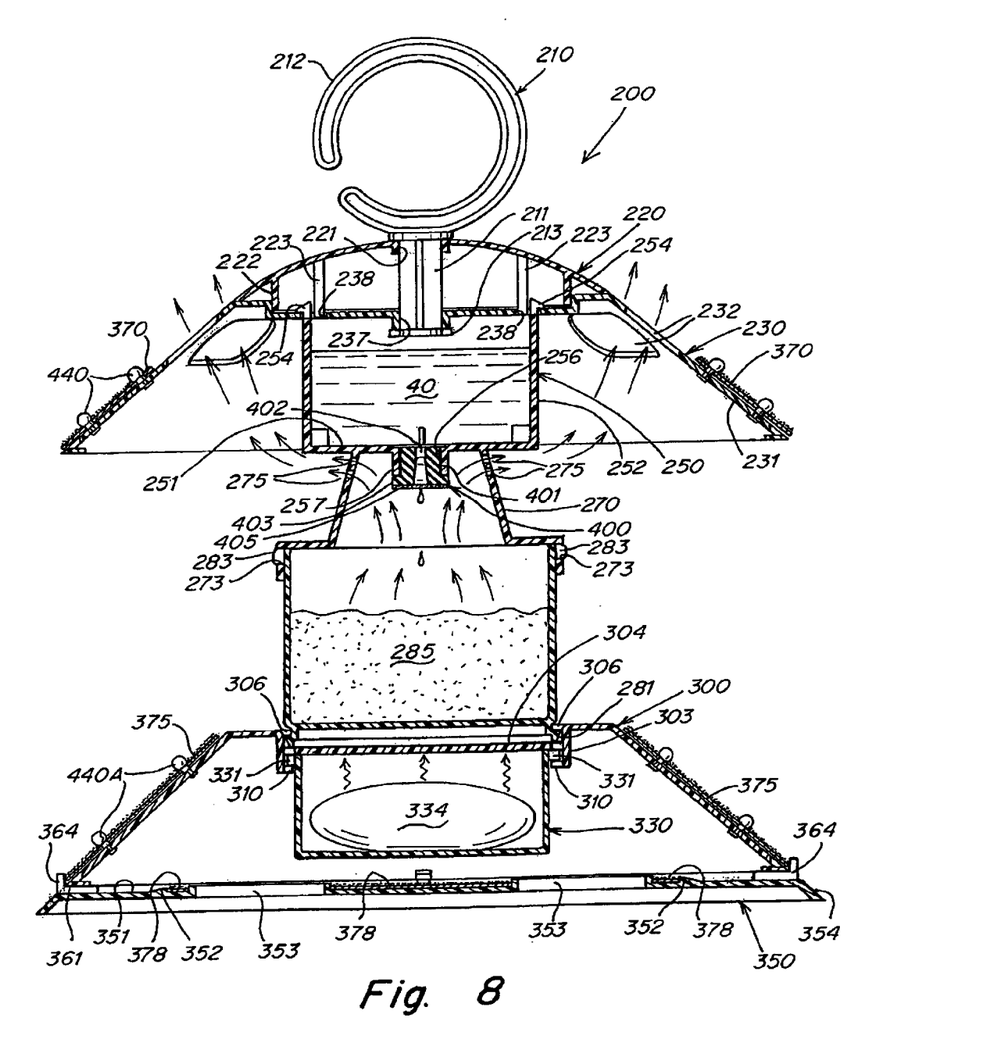
FIG. 8 is a cross-sectional elevation of the embodiment of FIG. 5.

The upper container or water cup 250 is symmetrically positioned above the frusto-conic section and may be integrally formed with it. For better rigidity a pair of gussets 276 may extend between the outer surface of the frusto-conic section and the bottom 251 of the cup 250. The cup further includes an upwardly extending cylindrical wall 252 continuous with the bottom 251. At the upper open end 253 of the cup 250 a pair of barbs 254 are integrally formed diametrically opposite one another. These barbs 254 extend outwardly, and engage openings 238 in the top wall of hood 230. An axially aligned opening or passage 256 is formed in the bottom 251. An annular wall 257 extends downwardly from the bottom 251 and defines the opening 256. The opening 256 is designed to receive in a secure and snug fit a valve 400 in a manner hereafter described. The inside of the cup 250 may be further reinforced by a plurality of corner gussets 258.

The valve 400 that fits into opening 256 is designed to limit the flow of water from the cup 250 downwardly through passage opening 256 into the fuel cup 280 to react with fuel contained in that cup. In its preferred form, the valve permits the slow drip of fluid through it. Preferably the valve 400 should permit the flow of fluid from a cup 250 full of water for many days and preferably at a constant rate for a period in the order of one week. The valve 400 should further be designed to permit the drip of this fluid at an approximate rate of 2 ml/hour. Other rates for different desired durations may be considered and the flow rate varied by obvious modification of the parameters of the valve 400.

Figure 9:
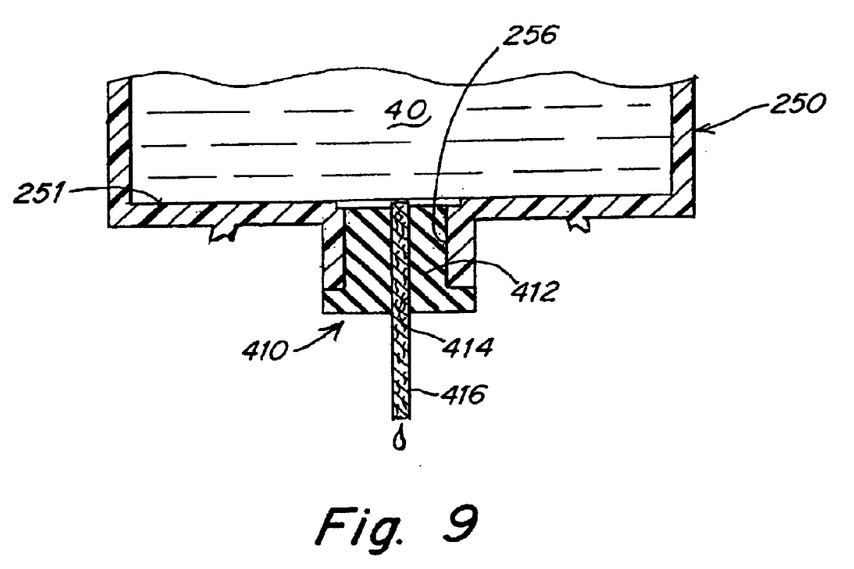
FIG. 9 is a cross-section of a portion of the invention illustrating the valve construction in one embodiment.

The valve 400 includes an annular body 401 having a passage 402 there through. The annular body 401 is formed at its lower end with an outwardly extending annular flange 403. The passage 402 may, as illustrated, be tapered from one end to the other. In a typical application, the diameter of the bottom may be in the order of ¼" whereas the diameter at the upper tapered end may be in the order of 0.187 inches. The valve may be formed of a conventional valve material such as rubber. One end of the valve may be covered with a filter sheet 405 designed to permit the migration or passage of water at a very slow rate through the filter paper into the fuel cup. The particular material used may comprise a semi-permeable membrane having a thickness and permeability factor selected for the particular purposes herein described. Other methods of diffusing water at a constant flow in the orders of magnitude considered may comprise a pipette, a wick, a sponge, felt filters, or other appropriate mechanism. If a wick is used it is secured in the passage 402. It should have sufficient permeability to permit the flow of water or other fluid from the cup 250 downwardly into the fuel cup 280 and onto the material contained in it. FIG. 9 illustrates such an arrangement. A valve 410 having a cylindrical body 412 with an axial opening 414 has a wick 416 secured in it. When in use the fluid 40 is wicked downwardly and drops of the liquid fall onto the material below. When installed, the valve 400 is fitted closely into the opening 256 with the annular flange 403 pressed upwardly against the bottom edge of the annular wall 257.

The hood or top shroud 230 has a frusto-conic wall 231. In a preferred embodiment, the wall 231 is provided with a series of holes or slots 232. These holes and slots are optional. If used, six holes will typically provide sufficient opening to permit insects to pass through. The top shroud is open at the bottom 233 and has a top wall 234 that is downwardly offset from the top edge 235 of the shroud 230. An annular wall 236 connects the wall 234 with a top of the shroud 230. A hole 237 is axially formed in the top wall 234. The hole 237 is a key-hole type hole as illustrated in the top plan view of the top shroud. The glue board or adhesive strip 370 is secured circumferentially about the shroud 230 at its lower edge. The glue boards or strips 370 are formed of any suitable flexible and sturdy material such as paper or cardboard. These boards are coated with an insect adhesive similar to the adhesives used on conventional fly paper. A wide range of adhesive materials capable of trapping an insect on its surface may be used. The strip 370 is conventionally formed as a flexible element having a frusto-conic shape. The ends of the strip 370 may be secured by two pairs of knobbed pins 440 which are riveted or as otherwise suitably secured to the outer surface of the top shroud. The strip 370 should maybe overlap at these pins at each end and be secured to it by popping the paper onto the pins at a location in which suitable cross slits have been formed in the paper to permit the pins to be forced through the strip 370.

A similar mechanism may be used to secure the strips 375 to the lower skirt 300 by two pair of pins 440A projecting from the skirt 300.

The dome 220 is formed with a central opening 221 having a key-hole shape, sized to receive the handle or hook 210. The bottom surface of the dome 220 is formed with an annular depending flange 222 that is shaped and sized to fit into and engage the recessed section defined by the annular wall 236 and top wall 234 of the top shroud 230. The dome is provided with a pair of downwardly extending dogs or tabs 223 that extend downwardly diametrically opposite one another into openings 238 in the top wall 234 of the shroud 230 to align the keyholes 221, 237 and lock in barbs 254 to prevent accidental release of 250 from 230.

The dome 220 is secured in a locked position with the top shroud 230 by the handle 210. This handle 210 (FIG. 23) is formed with a shaft 211 integrally formed with the hand grip 212. The base of the shaft 211 is preferably formed with an outwardly extending flange 213 having a keyhole configuration. The shaft 211 may have any suitable cross-sectional shape as may the hand grip 211, but for economy of material it is preferable the shaft 211 have an x-beam shape while the cross-section of the hand grip 211 may have an I-beam cross-section.

To interengage the handle 210, the dome 220, the top shroud 230, and the upper container 250 and its integrally formed frusto-conic section 270, the shaft 211 is inserted through the hole or opening 221 in the dome and the hole or opening 237 in the shroud 230. Once inserted to a point in which the flange 213 is below the wall 234, the handle is turned to lock the components together.

In the assembly described, the selected chemical composition previously described is inserted in the fuel cup 280, and water is inserted in the upper container 250. The units are assembled so that water in the upper container 250 will drip at a slow rate over a period of many days, in a manner as herein described from the upper container 250 through the valve 400 and onto the composition resting in the bottom of the fuel cup. There is a reaction between the water and the material in the fuel cup that emits carbon dioxide and other gaseous materials as previously described. The carbon dioxide moves through the lattice of openings 275, thus permitting carbon dioxide to escape and present an atmosphere attractive to ticks and mosquitoes.

The embodiments described also contemplates using a water cup insert in the water cup to negate variable pressure of a water column that decreases in height as the water moves from the cup.

The present invention also contemplates providing a birdcage-like cover to fit over the trap described in this present invention in order to preclude large objects such as pets, children, etc. from inadvertently brushing against the adhesive surfaces.

The top shroud 230 is illustrated in a preferred embodiment with a series of holes. It is contemplated, however, that the shroud may be made without holes or fewer or more holes than illustrated. The openings do provide an appearance of motion to an insect.

The present invention also contemplates forming the various components of plastic and in particular of plastic in different colors. In the preferred embodiment, the plastic components are preferably red or blue, and in a particular embodiment the fuel cup is blue and the upper shroud or skirt 230 black, with the remaining components red. In some instances, other colors are preferable attractants for insects or arthropods. For example, fleas are believed to be attracted to a yellow-green color. Provisions may also be made for colored paper or plastic to be wrapped around various components for use in attracting different types of insects or bugs.

Although the preferred embodiment of the invention outlines a series of chemicals that are believed to be when activated generate carbon dioxide which is attracted to insects. Other chemicals may also be used. For example, an octenol or other chemical block, pheromones, may attract specific insects.

Having thus described several aspects of at least one embodiment of this invention, it is to be appreciated that various alterations, modifications, and improvements will readily occur by those skilled in the art. Such alterations, modifications, and improvements are intended to be part of this disclosure, and are intended to be within the spirit and scope of the invention. Accordingly, the foregoing description and drawings are by way of example only.

What is claimed is:

1. An insect/arthropod trap comprising means for attracting insects and arthropods having a composition for emitting carbon dioxide in excess of ambient levels of carbon dioxide in the atmosphere over a period of at least several hours on interaction of the composition with an activating fluid, a container for the fluid, and a control for metering the flow of the fluid into contact with the composition, and trapping means positioned adjacent the means having the composition for trapping insects and arthropods.

2. An insect/arthropod trap comprising first and second containers for holding separate materials and an opening disposed between the first and second containers to selectively mix the materials together, wherein the materials are mixed together in the second container to generate an insect/arthropod attracting gas, openings in the second container enabling the gas to escape therefrom, and a member associated with one of the containers and having a surface on which an adhesive is applied for capturing insects attracted by the gas that alight on said surface.

3. An insect/arthropod trap as described in claim 2 wherein the first container is for holding an activating fluid and the second container is for holding chemicals which when mixed with the activating fluid generate the insect attracting gas, and means for controlling a flow rate of the activating fluid from the first container to the second container.

4. An insect/arthropod trap comprising a container with an adhesive at least partially extending about an outer surface of the container, wherein the adhesive is designed to trap insects and arthropods, a first compartment within the container for holding a first material, a second compartment within the container for holding a second material, a valve in fluid connection with at least one of the first and second compartments to control the release of at least one of the first material and the second material, wherein carbon dioxide is generated to attract insects and arthropods when the first material is mixed with the second material.

5. An insect/arthropod trap as described in claim 4 wherein the first material includes a quantity of baking soda, and the second material includes a quantity of water.

6. An insect/arthropod trap as described in claim 4 wherein at least a part of the container is substantially cylindrical shaped.

7. An insect/arthropod trap as described in claim 4 wherein the container includes a hood having a frusto conic shape.

8. An insect/arthropod trap comprising a base having a surface with an adhesive for capturing arthropods, a first container for holding a solid chemical for generating an arthropod attracting gaseous phase when mixed with a fluid, a second container disposed adjacent the first container for supplying fluid to the first container to generate the arthropod attracting gaseous phase, a hood having a surface for receiving an adhesive for capturing arthropods, and a connector joining the two containers for conveying fluid from the second container to the first container when the arthropod attracting gaseous phase is to be generated.

9. An insect/arthropod trap as described in claim 8 wherein the hood is frusto conic in shape and the surface for adhesive is on an inner side of said hood.

10. An insect/arthropod trap as described in claim 9 having a skirt positioned below the hood with an adhesive surface to trap mosquitoes, ticks, chiggers and fleas.

11. An insect/arthropod trap as described in claim 8 wherein the hood has holes spaced from one of the containers, said one of the containers having a surface consisting of fluorescent, UV reflective, or near-infrared reflective material such that, at a distance, two visible holes will be seen that may resemble the eyes of a mammal, with the holes permitting light to impinge on the one of the containers and allow alternative arthropod entry.

12. An insect/arthropod trap as set forth in claim 8 wherein the solid chemical includes a quantity of baking soda and lactic acid and the fluid is selected from the group comprising water and a weak acid positioned to be delivered to the soda and lactic acid in incremental amounts over a time period.

13. An insect/arthropod trap as set forth in claim 12 having an attractant in the form of a colored member with the color of the member selected from the group comprising black, white, blue, red and green.

14. An insect/arthropod trap as set forth in claim 8 wherein the solid chemical includes a quantity of urea and the fluid is selected from a group comprising water and a weak acid positioned to be delivered to the urea in incremental amounts for generation of ammonia.

15. A method of disposing of insects and arthropods comprising providing a first chemical composition in a first container, a second chemical composition in a second container, and a valve in fluid communication with at least one of the first and second containers, adjusting the valve to react the first chemical composition with the second chemical composition to generate carbon dioxide over a time of at least about several hours at levels in excess of ambient levels of carbon dioxide in the atmosphere, sufficient to be detected by insects and arthropods, and using trapping means for trapping the insects and arthropods attracted by the carbon dioxide emission for disposition.

16. A method as set forth in claim 15 wherein levels of carbon dioxide are generated over a period of days from an initial charge of the chemical compositions.

17. A method as set forth in claim 16 wherein the first chemical composition comprises a mixture including baking soda and the second chemical composition includes water.

18. A method as set forth in claim 17 including the step of exterminating the insects and arthropods when using the trapping means.

19. A method as set forth in claim 16 wherein the first chemical composition comprises a solid mixture of sodium bicarbonate and at least one chemical selected from the group consisting of lactic acid, and/or urea and the second chemical composition comprises water and/or a weak acid.

* * * * *